(12) United States Patent
Jacobs

(10) Patent No.: US 7,641,285 B2
(45) Date of Patent: Jan. 5, 2010

(54) SMALL UTILITY VEHICLE

(76) Inventor: Jed Jacobs, 2496 N. 2375 E., Hamer, ID (US) 83425

( * ) Notice: Subject to any disclaimer, the term of this patent is extended or adjusted under 35 U.S.C. 154(b) by 201 days.

(21) Appl. No.: 11/903,082

(22) Filed: Sep. 20, 2007

(65) Prior Publication Data

US 2009/0079254 A1    Mar. 26, 2009

(51) Int. Cl.
*B60P 1/28* (2006.01)
(52) U.S. Cl. .................. 298/18; 298/1 C; 298/22 C
(58) Field of Classification Search ................ 298/1 C, 298/18, 22 R, 22 C
See application file for complete search history.

(56) References Cited

U.S. PATENT DOCUMENTS

| | | | |
|---|---|---|---|
| 3,891,043 A | 6/1975 | Valdex | 180/13 |
| 4,645,264 A | 2/1987 | Morrison | 298/1 |
| 5,284,218 A | 2/1994 | Rusher, Jr. | 180/19.1 |
| 6,155,648 A | 12/2000 | Dombek et al. | 298/1 C |
| 6,293,627 B1 | 9/2001 | Jansen et al. | 298/1 C |
| 6,578,924 B2 | 6/2003 | Jansen et al. | 298/1 C |
| 6,669,304 B2 * | 12/2003 | Binning | 298/17.7 |
| 6,997,667 B2 | 2/2006 | Hackett et al. | 414/685 |
| 2005/0196261 A1 | 9/2005 | Green | |

* cited by examiner

*Primary Examiner*—Stephen Gordon
(74) *Attorney, Agent, or Firm*—John H. Miller

(57) ABSTRACT

A small, four wheeled, stable utility vehicle (S4WSUV) for hauling and dumping material, articles or containers and especially adapted to operate in tight areas is disclosed. The S4WSUV has two widely spaced free turning swivel wheels and two widely spaced, independently driven rear wheels, a pivoting platform connected to a lifting mechanism for pivoting the platform to dump the material, etc. to a side of the S4WSUV. An engine drives a power source that can be a hydrostatic system, an electrical system or a mechanical system for motors driving the rear wheels. Optional features include a cantilever mounted seat assembly, foot and/or hand controls for steering, container mounts on the platform or a platform frame for securing one or more containers of various types and sizes and attachments for attaching one or more pieces of equipment for functions other than hauling and dumping.

20 Claims, 7 Drawing Sheets

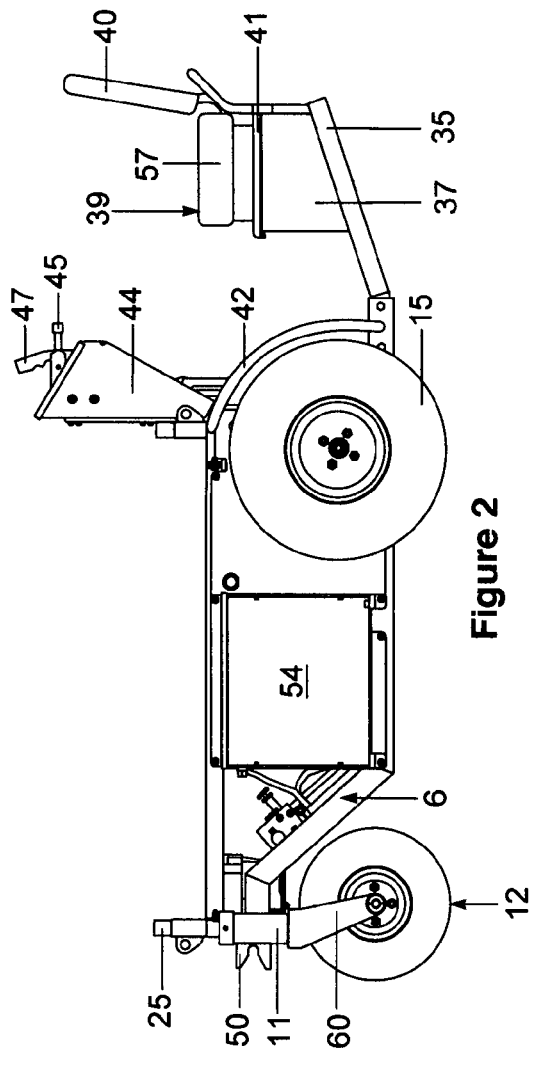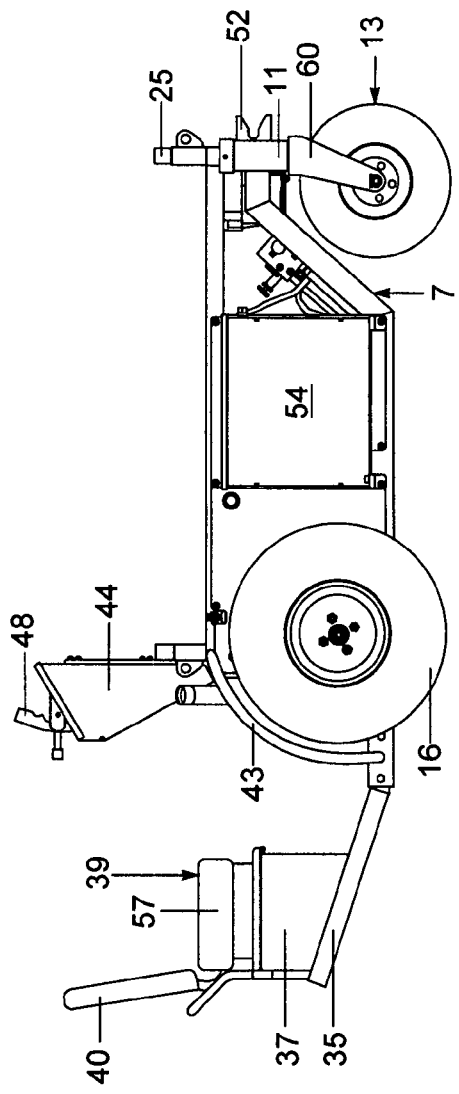

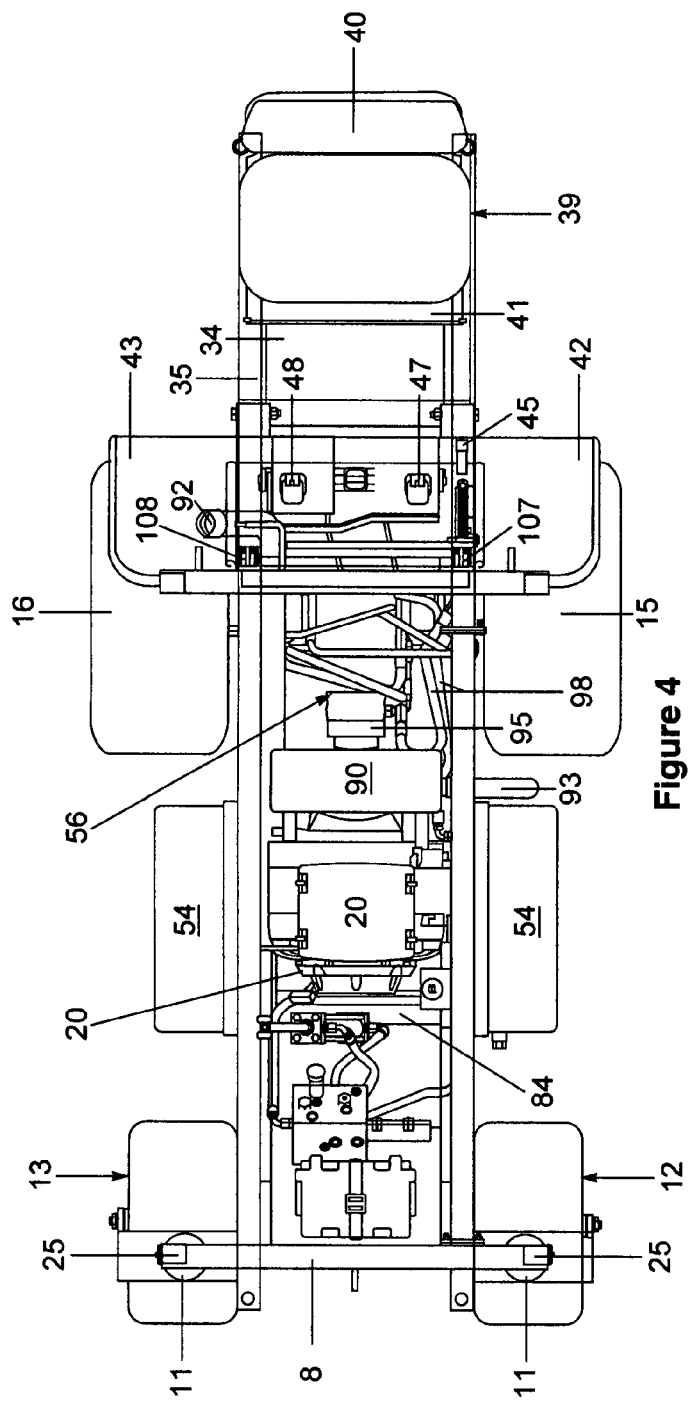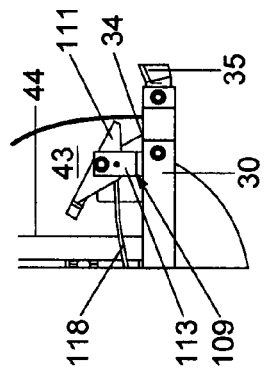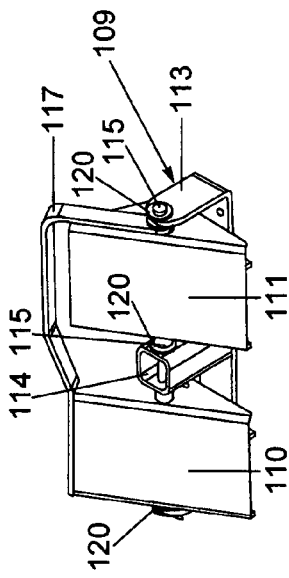

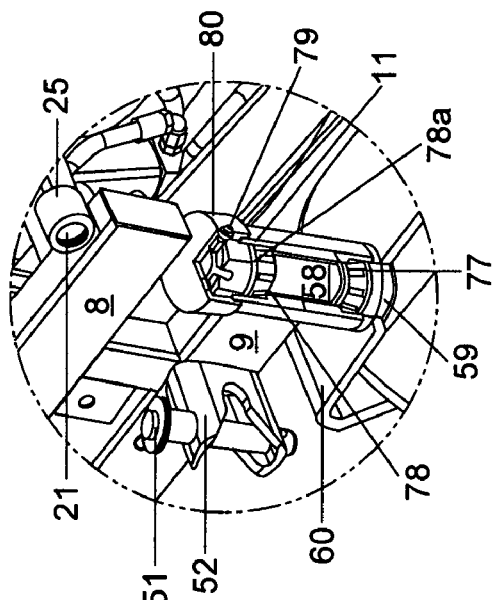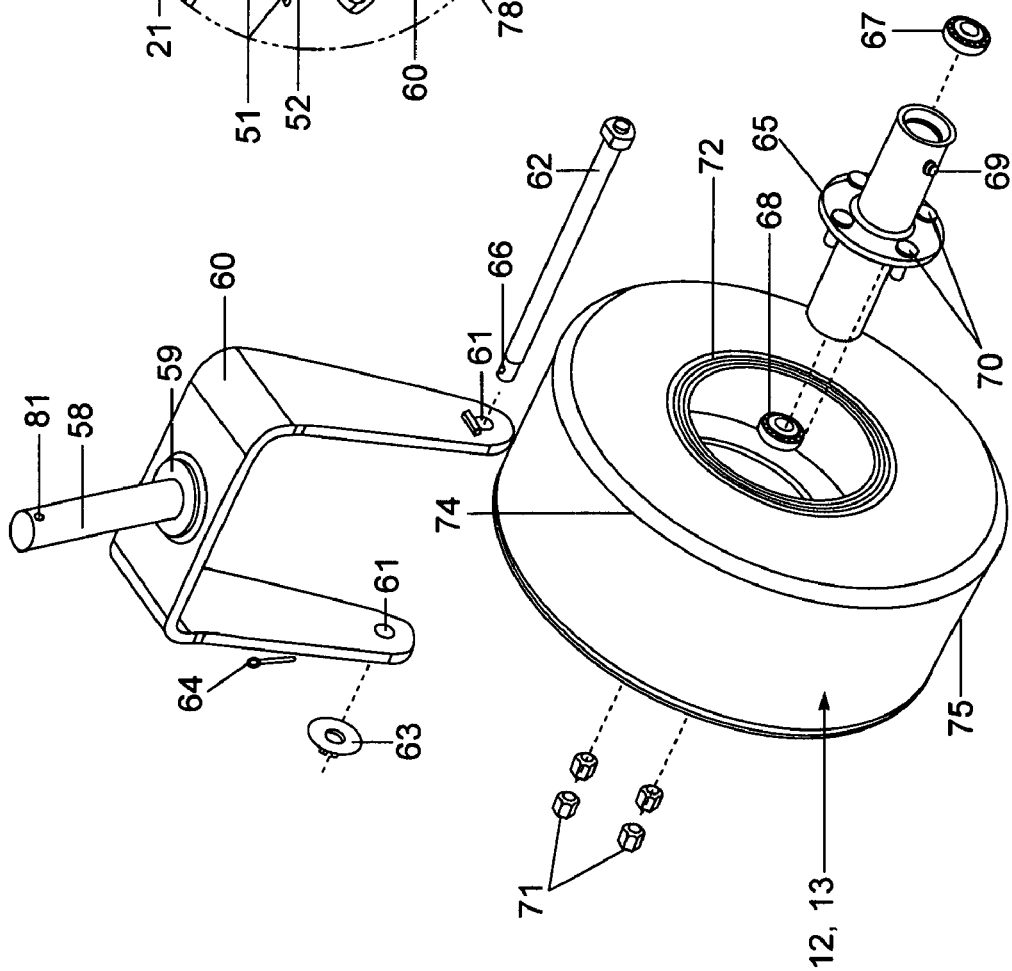

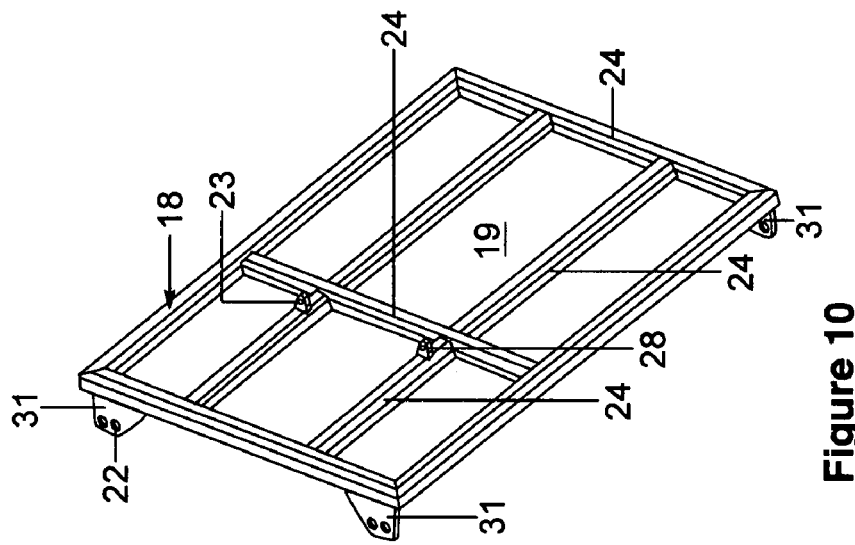
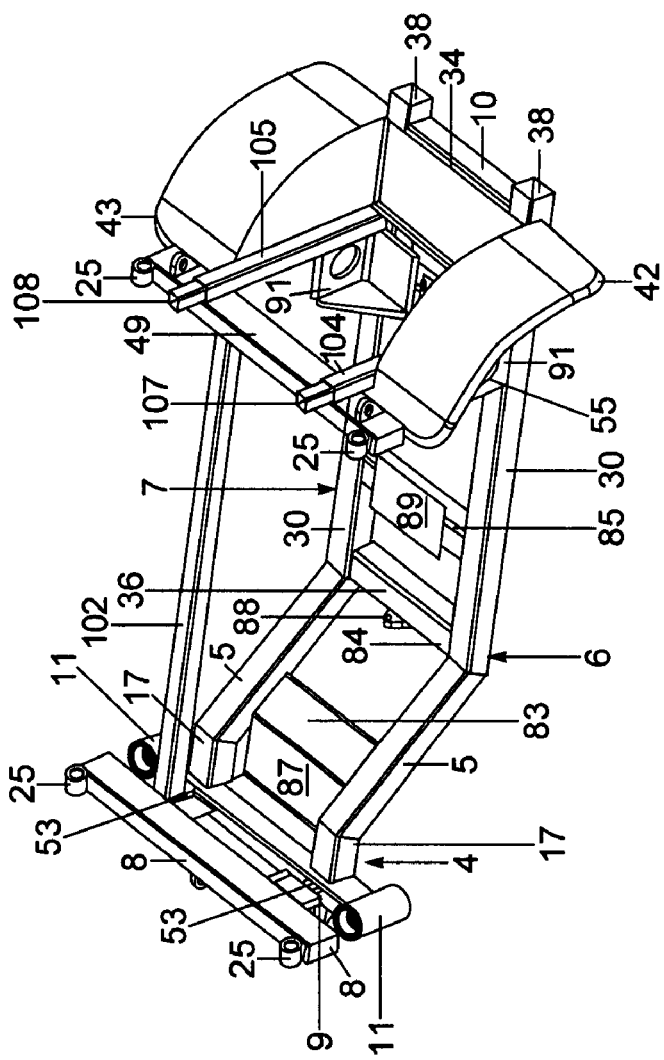

SMALL UTILITY VEHICLE

The invention involves a powered, small, stable utility vehicle for hauling and dumping and for pulling or carrying other equipment for various functions.

BACKGROUND

Small utility vehicles exist for various uses. For example, riding grass mowers having what is called zero turn radius have existed for some time, but these mowers are not designed for carrying and dumping loads of material like mulch, rock, dirt, hay bales, tools and other similar materials and articles.

Other small utility vehicles, some powered, are know for specific purposes. For example single wheeled wheelbarrows are known, but still require manual lifting for movement and dumping. U.S. Pat. No. 3,891,043 discloses a powered wheelbarrow having a single wheel up front being powered by an internal combustion engine drive and two handles for steering and dumping. An attached two wheeled seat and foot rest is connected to the rear of the wheelbarrow and has 2 un-driven wheels for the operator to ride on. The wheelbarrow is dumped with manual labor of the operator, thus undesirably limiting the hauling capacity to that which the operator can manually using the handles.

U.S. Pat. No. 4,645,264 discloses a powered front dumping vehicle or buggy that can be operated by the operator walking behind, standing on a rear platform or sitting on a seat mounted on the rear platform. This powered dumpster has spaced apart dual wheels at the front with a single swivel wheel at the rear. It is powered with an internal combustion engine driving a hydraulic pump, and using a hoisting cylinder and control valve the hopper is dumped. The drive comprises control valves and a hydraulic motor on each wheel driving the front dual wheels. The powered dumpster is steered with a handle or a steering wheel that moves the swivel wheel in the rear.

U.S. Pat. No. 5,284,218 discloses a motorized wheelbarrow having a front mounted internal combustion engine driving two spaced apart front wheels via belts and a manual operated belt tightener. The rear of the wheelbarrow is supported by two spaced apart swivel castor wheels in the rear. A handle like a lawn mower handle is mounted at the rear with the belt tightener or gear changing lever and a throttle. The wheelbarrow is steered by an operator using the handle and rear castor wheels, and the operator must manually dump the loaded wheelbarrow.

U.S. Pat. No. 6,155,648 discloses a motorized dumpster supported on spaced apart pairs of dual wheels at the front of the frame and a pair of closely spaced steerable wheels near the rear center of the frame. The motorized dumpster can be operated by walking behind or by folding down a platform at the rear and riding standing up. The motorized dumpster has a handlebar control at the rear of the vehicle. The handlebar has twist grips and one of the twist grips causes the motorized dumpster to move forward when twisted in one direction and backward in when twisted from neutral in the opposite direction. While individual hydraulic motors drive the front two wheel sets in forward, neutral and reverse, both wheel sets are driven at the same speed—steering is accomplished by turning the rear wheels with the handle bar. The motor also generates electricity that is stored in an AC charge coil and run through an AC/DC converter to two solenoids that activate and deactivate a hydraulic cylinder for dumping the bucket.

U.S. Pat. Nos. 6,293,627 and 6,578,924 disclose a front dumping motorized dumpster having a dump container and two spaced apart driven front wheels and at least one optionally driven, pivoting and centrally located rear wheel steered using a handle bar. The dump container is pivotally mounted on the front of the frame of the vehicle.

U.S. Pat. No. 6,997,667 discloses a typical Bobcat® equipped to accept numerous implements on the front end. It is steered by skidding, i.e. locking both wheels on one side while allowing the two wheels on the opposite side to drive, by steering all four wheels or by driving one wheel in an opposite direction as the opposing wheel. The drive system is not disclosed in detail. None of the wheels are swivel castor wheels.

Published Patent Application 20050196261 discloses a powered utility vehicle small enough to operate in confined spaces and that minimizes damage to landscape while providing such tasks as hauling and dumping. The vehicle comprises a frame, a motor, a drive train, a bed or box for supporting or containing a load, and a box dumping mechanism. It is stated that the track type drive system can be replaced with wheels and that known drive trains and drive systems can be used, but none are described in detail.

SUMMARY OF THE INVENTION

The invention includes a small, four wheeled, stable, utility vehicle, S4WSUV for short, for tasks including hauling and dumping comprising;

a) a frame having a length or lengths and a width or widths, b) four wheels, two widely spaced apart front wheels being supported by a front portion of the frame and mounted to freely swivel, and two widely spaced apart independently driven rear wheels spaced from the two swivel wheels and supported by a rear portion of the frame with one rear independently driven wheel being one side of the frame and the other independently driven wheel being on the opposite side of the frame, c) one or more engines, d) a motor or drive mechanism for driving each of the driven rear wheels, e) a platform pivotally supported by the frame for supporting material or one or more articles or one or more containers, f) a lifting mechanism communicating with a point off-center of the platform for pivoting the platform to dump the material, article(s) and/or the one or more containers on or attached to the platform, g) a power source for the motors and lifting mechanism, and h) controls for activating the motors and the lifting mechanism.

By small is meant smaller than a small pickup truck and larger than a typical manually powered and operated wheelbarrow. By small is meant no longer than about 14-15 feet, more typically no longer than about 12 feet, most typically no longer than about 11 feet and preferably no longer than about 9 or 10 feet. These lengths apply only to the utility vehicle, including a seat assembly, but do not include any functional attachments including a snow plow, snow blower, mower, wagon or cart sprayer, etc. The small, four wheeled, stable, utility vehicle of the invention is useful for hauling and dumping most all kinds of things in yards, golf courses, parking lots, parks, etc. and on construction sites, farms and ranches. It is stable because of having four wheels with two sets of widely spread wheels, but widely spaced apart meaning spaced apart at least more than half the width, more typically at least ¾ the width, and most typically at least about 85 percent of the width of the frame. In the preferred embodiment the independently driven wheels are outside the frame and the front swivel wheels are outside side rails of the frame.

The platform is pivotally mounted to one side of the frame so that the platform, or one or more containers attached to the platform, are side dumping. This also makes the, four wheeled utility vehicle of the invention more stable than front dumping utility vehicles where the container is pivotally mounted to the front of the frame causing the center of gravity of the load to move outside the frame upon dumping, making the vehicle less stable.

The S4WSUV of the invention has an engine, typically an internal combustion engine, that drives a power source such as one or more hydraulic pumps, or in the alternative an electric generator, or a gear, chain, belt or combination set, and this power source provides power to drive a motor or a gear, pulley or sprocket on each the rear wheel independently, and usually also provides power directly or indirectly for the lifting mechanism. A conventional fuel tank to hold fuel for the engine is also included in/or on the frame, optionally with a filler hose and cap. The fuel can be any commonly used internal combustion fuel including gasoline, diesel fuel, propane, etc., with or without additives like ethanol, methanol, alcohol, etc. The motors are most typically hydraulic motors and the lifting mechanism is most typically a hydraulic cylinder, but the motors can alternatively be electric motors and the lifting mechanism can be a ball and screw cylinder or a rack and pinion, scissor jack or equivalents thereof driven with an electric motor, or a hydraulic motor. In the embodiments using an electric generator, one or more electric storage batteries can also be present in an electrical system to provide a power reserve and/or to allow the rear wheels to be driven for a short while and/or to allow the lifting mechanism to operate for a short time without having to start the engine. In any instance, an optional battery can be included to start the engine, or the engine can be started with a pull cord, crank or other manual device.

The S4WSUV of the invention normally comprises a hydraulic system or an electrical system or both, for providing a power source to the motors and to the lifting mechanism. The hydraulic system used in the invention can also comprise a reservoir, filter and other devices conventionally used with hydraulic fluid as part of a hydraulic system. A hydrostatic system is preferred for the invention. In the hydraulic system the rate of flow of hydraulic flow to the motor determines the speed of movement, the direction of flow provides the direction of movement and the pressure in the hydraulic system provides the power. The advantages of a hydrostatic system compared to a mechanical drive system include compactness, almost infinite degrees of speed change and torque, ease of control, smooth changes in speed while moving and high torque for starting to move. Of course, an electrical power source and drive system also comprises most of these advantages plus an avoidance of hydraulic oil leaks and drips.

The controls for the invention, normally located in a rear portion of the utility vehicle, comprise actuators for the valves for the hydraulic system power source and/or switches for the electrical system power source. The hydraulic valves can be shifted to fully open, fully closed, and partially open, either mechanically or by electrical solenoids, servo motors, stepping motors, or the like. The electrical switches usually have on or off positions, but the speed control typically includes a throttling or variable type of electrical control that is well known including, but not limited to, varying the voltage, the shunt field current or the frequency of the electrical power to the motors. The controls can include foot-actuated controls, hand-actuated controls or preferably both. While not preferred, the vehicle of the invention can be driven with a mechanical drive system for each independently driven wheel instead of a motor for each driven wheel. The drive mechanism can comprise a chain or belt and/or gear drive driven by the engine. Thus, through a belt, chain, gear set or an equivalent engaging system like a variable magnetic drive, transmission, and the like, the engine can cause each of the rear driven wheels to turn forward or backward in response to the controls.

Each of the two, spaced apart, free turning, swivel wheels located below the front portion of the frame, usually castor assemblies, are usually at least 2 inches wide, but more typically are at least about 3-6 inches wide and most typically are at least about 8-10 inches wide, such as an 18-8.5-8 smooth 4 ply tire to exert low pressure to the ground so as not to make ruts or undesirable linear depressions in the ground. The swivel wheels are spaced apart at least about at least about 12 inches, more typically at least about 15-18 inches and preferably at least about 19-20 inches.

The independently driven rear wheels should be at least as wide as the front wheels and preferably are wider for the same reasons and to provide good traction. The independently driven rear wheels should be spaced apart at least about 15 inches, preferably at least about 18 inches most typically at least about 20 inches and most preferably at least about 21 or about 22 inches. The distance between an axis of a front free turning swivel wheel and an axis of the independently driven rear wheel on the same side of the S4WSUV is at least about 36 inches, typically at least about 46 inches, more typically at least about 50 inches and preferably at least about 56 to at least about 59 inches. This type of wheel spacing provides superior stability to prior art buggies with the greater the spacing the greater the stability. The side dumping feature also contributes to the superior stability of the S4WSUV of the invention. The tires on the front and rear wheels can be metal or plastic or hard rubber, but preferably, particularly on the rear wheels, are inflated, rubber balloon tires.

The S4WSUV of the invention can be used with only a platform to haul things like lumber, bales of hay or similar items. The platform can be a single layer or sheet of a material like metal, plastic, reinforced plastic or wood, with or without further reinforcement such as a one or more ridges, dimples, reinforcing members, reinforcing layers, or frame(s). The platform can be continuous with or without openings of any shape or discontinuous such as a plurality of slats in near contact or closely spaced apart arrangement. For hauling sand, gravel, mulch, natural or man-made fertilizer and the like, it is preferable to attach a removable container like a box or set of racks to the platform in any suitable manner that will keep the container on the platform while moving and dumping. Containers having at least two sides, preferably at least three sides and even with 4 sides, the sides being of any reasonable desired height can be used on the invention. The container can have a bottom spanning the sides, but need not have since the platform can form the bottom if desired. The sides can be continuous or can have openings of any desired size, spacing and shape or can be spaced apart slats, such as for hauling brush, hay, etc. Also, round, oval, etc. containers having only one continuous side can be used, such as might be used for hauling liquids or slurries.

The S4WSUV of the invention can be operated by walking behind while holding onto the controls, but preferably the invention also comprises a second frame and platform mounted to the rear portion of the frame for the operator to stand on while operating the invention. As a further option, the second frame, with or without the second platform, can further comprise a seat assembly for the operator to sit in while operating the invention. The cantilevered seat position takes weight off of the front of the S4WSUV making it easier to steer with the independently driven rear wheels. Optional dual foot and hand steering controls on the S4WSUV of the invention makes steering more convenient and the independently driven rear wheels and free swiveling front wheels permit the S4WSUV to readily achieve what is commonly referred to as a zero turn radius, i.e. to be able to turn on a dime so to speak. This feature is very important for many uses of the vehicle where it must operate in small spaces to be able to deliver its load in the most convenient or needed location. The system and method of steering the S4WSUV of the invention requires much less effort and attention than the handle bars of prior art buggies, allowing the operator to focus more on properly and safely positioning the S4WSUV to dump the load in the desired location.

The S4WSUV of the invention can also optionally have one or more brackets, holes or attachments on the frame, and/or on the platform and/or on a platform frame for attaching other functional equipment for pulling, pushing or transporting the equipment while idle or in operation, e.g. a hitch for pulling a wagon, cart, etc., attachments for easily attaching a snow plow, earth tilling equipment, mowers, spray equipment, a heavy roller, and similar functional equipment.

When the word "about" is used herein it is meant that the amount or condition it modifies can vary some beyond that stated so long as the advantages of the invention are realized. Practically, there is rarely the time or resources available to very precisely determine the limits of all the parameters of one's invention because to do so would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors' disclosure and understanding the inventive concept and embodiments disclosed including the best mode known to the inventor, the inventor and others can, without inventive effort, explore beyond the limits disclosed to determine if the invention is realized beyond those limits and, when embodiments are found to be without any unexpected characteristics, those embodiments are within the meaning of the term "about" as used herein. It is not difficult for the artisan or others to determine whether such an embodiment is either as expected or, because of either a break in the continuity of results or one or more features that are significantly better than reported by the inventor, is surprising and thus an unobvious teaching leading to a further advance in the art.

BRIEF DESCRIPTION OF THE DRAWINGS

FIG. 2 is a left side view of the small, four wheeled, stable, utility vehicle shown in FIG. 1.

FIG. 3 is a right side view of the small, four wheeled, stable, utility vehicle shown in FIG. 1.

FIG. 4 is a plan view of the vehicle shown in FIGS. 1-3.

FIG. 5 is a partial cross section taken along lines G-G in FIG. 4 showing a foot control assembly.

FIG. 7 is an exploded view of a free turning swivel wheel assembly for use on the vehicle of FIGS. 1-6.

FIG. 8 is a partial perspective view showing a bearing housing for use in supporting the swivel wheel assembly shown in FIG. 7.

FIG. 9 is a perspective view of a preferred frame used on the vehicle shown in FIGS. 1-6.

FIG. 10 is a perspective view of a preferred platform frame and platform, looking from the bottom or frame side, used on the vehicle shown in FIGS. 1-6.

FIG. 13 is a perspective view of the foot control assembly shown in FIG. 5.

DETAILED DESCRIPTION OF PREFERRED EMBODIMENT AND SOME OPTIONS

Figure 1:
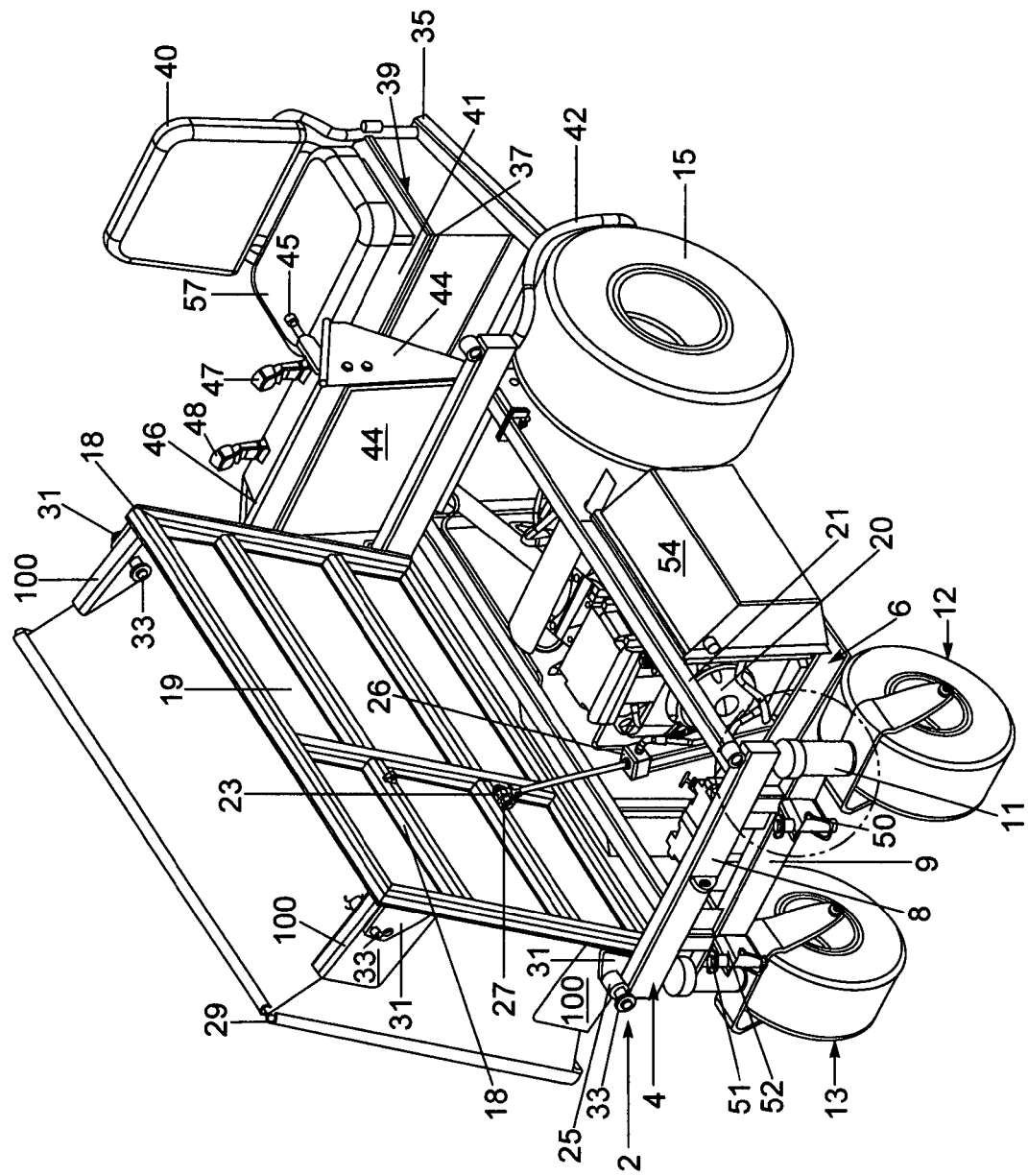
FIG. 1 is a schematic of a preferred embodiment of the invention with the platform supporting a box and in a dumping position.
Figure 6:
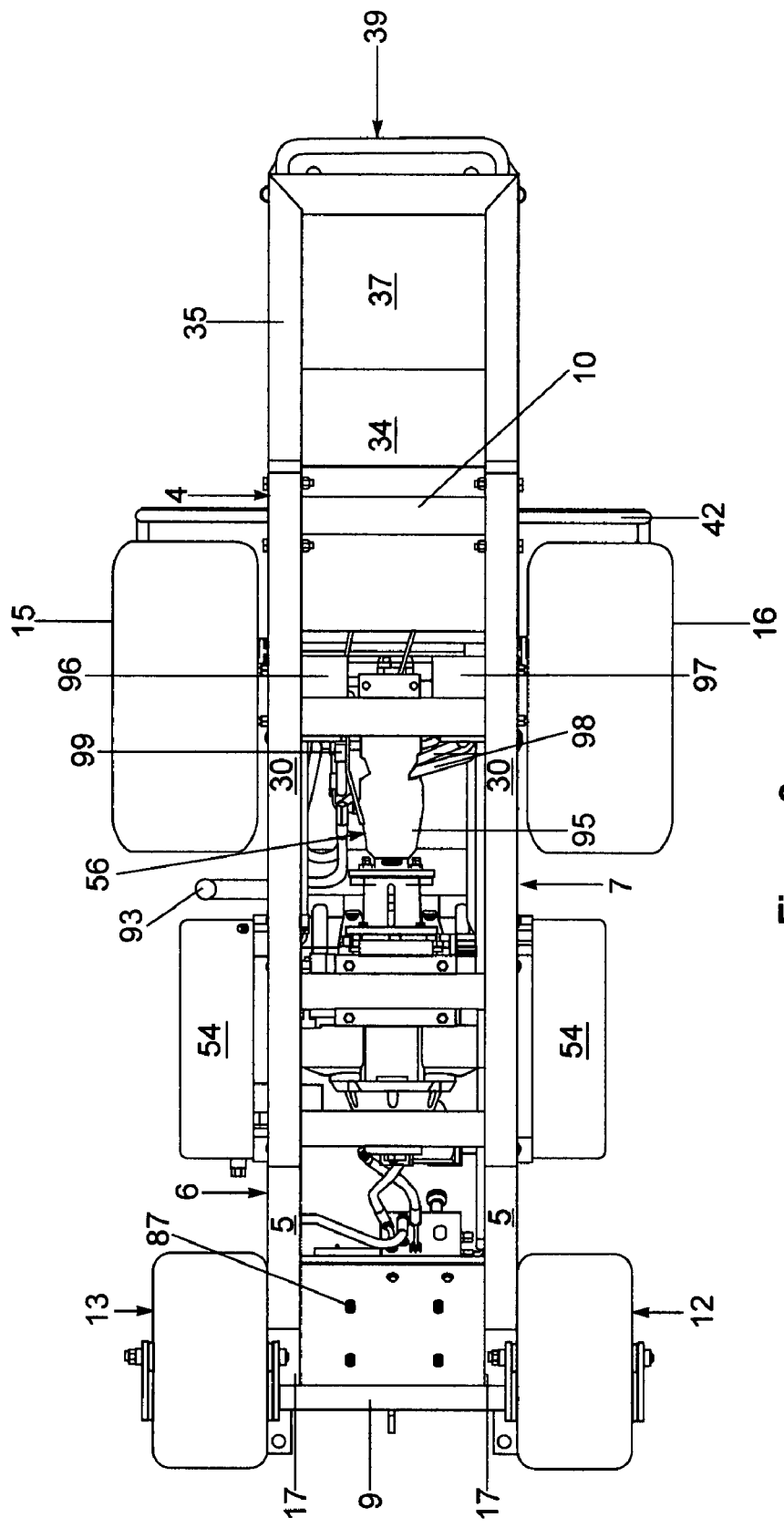
FIG. 6 is a bottom view of the vehicle shown in FIGS. 1-4.

A schematic view of the preferred embodiment of the small, four wheeled, stable, utility vehicle, S4WSUV for short, 2 of the invention is shown in FIG. 1 and other views are shown in FIGS. 2-6. The S4WSUV 2 is comprised of a frame 4 including a left side member 6, a right side member 7, an optional upper front cross member 8, a lower front cross member 9 and a rear cross member 10 (see FIG. 6). The S4WSUV further comprises two front swivel wheel assemblies 12 and 13, two independently driven rear wheels 15 and 16 (see FIG. 3), an engine 20, a power source 57 (see FIG. 4), a control panel 46, a lifting mechanism 26 for lifting one side of a platform frame 18 that is pivotally mounted to two platform supports 25, spaced apart and attached to one side of the frame 4 on top of the first front rail 8 and to a upper rear cross member 49 (see FIG. 9), to dump material on a platform 19 attached to the top of the platform frame 18, or material in a box 29 attached to box supports 31 attached to the top of the platform frame 18 near each corner of the platform frame 18 (see FIGS. 1 and 10).

A preferred frame 4 is shown in detail in FIG. 9. This frame 4 is comprised of a first front rail or cross member 8, attached to a second, lower front rail or cross member 9 with two or more spaced apart front vertical frame members 53. The second, lower front rail or cross member 9 is joined at or near each end portion to a back rail or cross member 10 with a left side rail 6 and a and a right side rail 7. Each side rail 6,7 can be straight or curved, one piece or sections attached together and preferably each is made up of a short upper section 17 that is attached to the second front rail 9 on one end and to a downwardly longer transition section 5 attached to a lower, longer frame section 30. These preferred side rails 6,7 permit a lower center of gravity for the vehicle as a whole, important to the stability of the S4WSUV. The rear upper cross member 49 is attached to each side rail 6,7 with two or more spaced apart rear vertical members 55. Other spaced apart cross members 36 spanning the side rails 6,7, and attached thereto, are positioned to make the frame 4 more rigid and to support various elements of the S4WSUV. A transition cross member 83 spans between left and right transition sections 5 near the front of the S4WSUV. A first mid-cross member 84 spans between the side rail lower sections 30 near the transition sections 5 and a second mid-cross member 85, spaced from the first mid-cross member 84 towards the rear of the S4WSUV also spans between the side rail lower sections 30. Optional upper side rails further rigidify and strengthen the frame 4. A left upper side rail 101 attached at a rear end to a left rear vertical member 104 (see FIG. 11) and a front portion to the top of the second, lower front rail/cross member 9 near its left end and adjacent or near the left tubular housing 11. A right upper side rail 102 is attached at a rear end to a right rear vertical member 105 (see FIG. 9) and a front portion of the right upper side rail 102 is attached to the top of the second, lower front rail/cross member 9 is attached near its right end and adjacent or near the right tubular housing 11. An upper portion 107 of the of the left rear vertical member 104 and an upper portion 108 of the right rear vertical member 105 support the control panel supports 44.

The various frame members are attached together by any suitable means including welding and/or bolting. The spaced apart cross members 36 can have plates attached such as front plate 87, vertical plate 88 and support plate 89 to attach other elements of the S4WSUV. Also, each side rail lower section 30 has a rear wheel hub support 91 attached thereto near or adjacent to the rear vertical members 55 for mounting the driven rear wheels 15,16 and the drive motors 22,24.

Attached to each end portion of the second, lower front rail or cross member 9 is a tubular housing 11, each for holding a left front swivel wheel assembly 12 and a right front swivel wheel assembly 13, both front swivel wheel assemblies 12 and 13 being of the free turning or caster type assemblies. Any known type of free turning or caster type assembly can be used, but a preferred type is shown in FIGS. 7 and 8. This caster type assembly 12, 13 comprises a swivel shaft 58 rigidly attached to a wheel bracket 60 having holes 61 for supporting an axle 62. A seat washer 59 surrounds the swivel shaft 58 for contact with a lower surface of the tubular housing 11. The axle 62 passes through bearings 68,68 located in a wheel hub and bearing tube 65 containing lug bolts 70 for passing through holes (not shown) in a rim 72 in a known manner with the rim 72 being secured in place with lug nuts 71. A tire 74 is mounted on the rim 72 and the tire 74, rim 72, wheel hub and bearing holder 65 are secured to the wheel bracket 60 by the washer 63 and keeper pin 64 passing through a hole 66 near the end of the axle 62. Any durable type of tire 74 can be used including a metal, solid plastic, solid or inflated rubber, or an elastomer tire. A contacting surface 75 of the tire 74 can be smooth, textured in any manner including having a conventional tread. The free turning caster assembly 12, 13 is secured to the frame 4 with the tubular housings 11. As shown in FIG. 8, the swivel shaft 58 passes through a lower bearing 77 and an upper bearing 78 and is held in place by a keeper washer 78a resting on the top of tubular housing 11 using a keeper pin (not shown) passing through a hole 81 in the swivel shaft 58 above the keeper washer 78a. The top of each tubular housing 11 is sealed against dirt, etc. with a cap 80. The bearings 77,78 are kept lubricated with a grease zert 79 located in each tubular housing 11. The use of ball or roller bearings 77,78 and lubrication keeps the swivel wheel assemblies 12, 13 free turning for enhancing turning of the S4WSUV.

Returning to FIGS. 1-6, the engine 20 can be of various types as known in the art, depending on the horsepower, type of fuel and other options desired. Preferably the engine 20 has a horizontal drive shaft, is air-cooled and burns gasoline, diesel or propane. In the preferred embodiment shown, a Honda® GX620K1 QAB or QAD2 overhead valve 18 or 20 HP engine 20, preferably with a conventional electric starter, is used. The engine 20 is mounted on the horizontal plate 89 (FIG. 9), has a muffler 90 and an exhaust pipe 93. One or two fuel tanks 54 are mounted to the frame 4 on a side rail 6 and/or 7 and filled with a fuel filler pipe 92. This engine 20 has a remote throttle and choke (not shown) mounted on the control panel 46.

Figure 12:
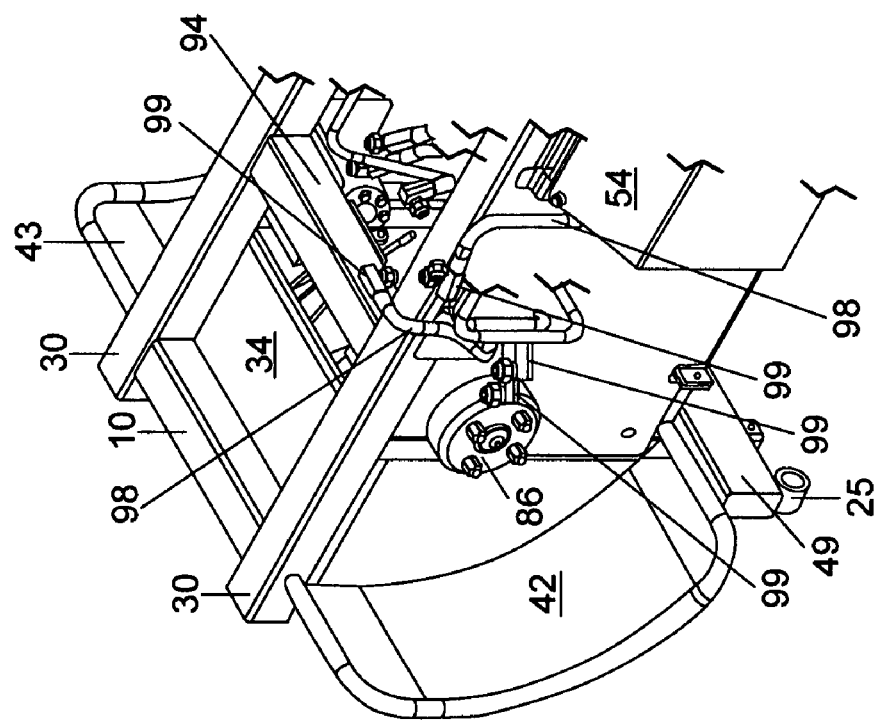
FIG. 12 is a partial perspective view of the bottom of the rear part of the preferred frame and showing some parts of an independent drive system for the rear wheels of the vehicle shown in FIGS. 1-6.
Figure 11:
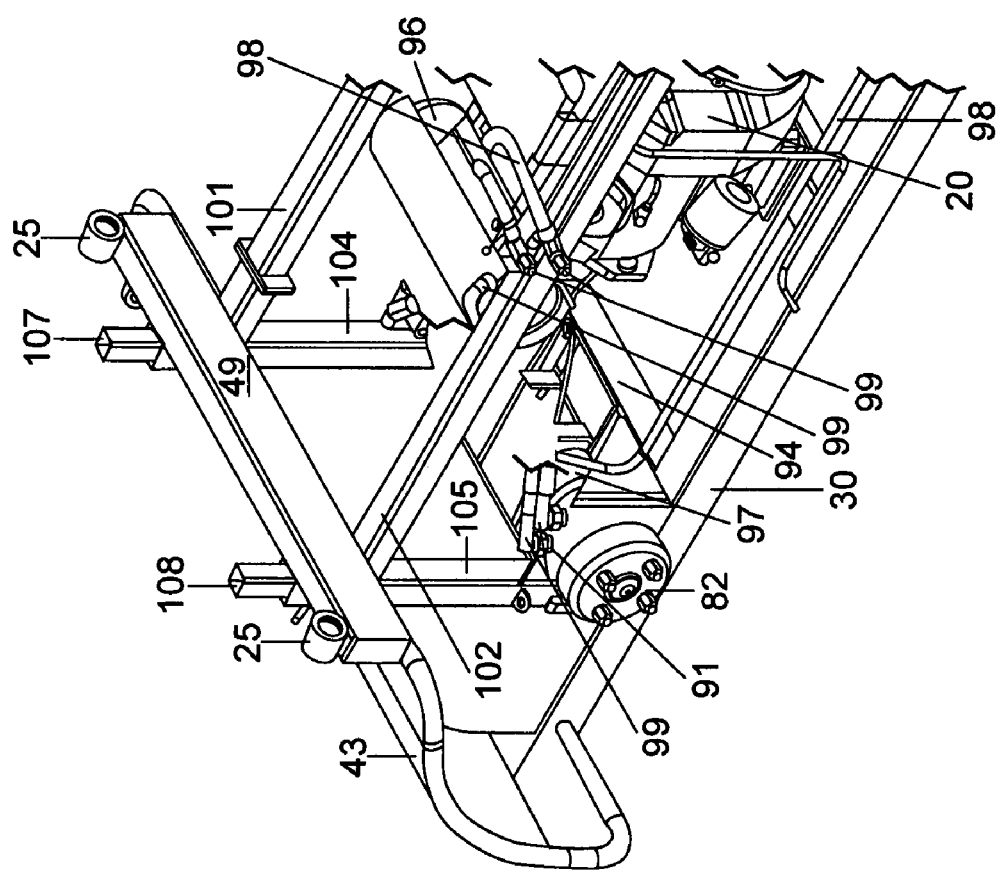
FIG. 11 is a partial perspective view of the top of the rear part of the preferred frame and showing some parts of an independent drive system for the rear wheels of the vehicle shown in FIGS. 1-6.

The engine 20 drive shaft (not shown) drives a power source 56, preferably a conventional hydraulic pump 95 (FIGS. 4 and 6) that is part of a conventional hydrostatic drive. As is known, hydrostatic drives comprise a hydraulic pump 95, hydraulic motors 96 (left) and 97 (right), each hydraulic motor mounted to each rear wheel motor and hub mount 91 for driving each of the independently driven rear wheels 15 and 16 respectively, various valves (not shown) and numerous hydraulic fluid hoses 98 and fittings 99 between the hydraulic pump 95, the valves (not shown), hydraulic fluid reservoir (not shown), and the motors 96,97 as is known. A right rear wheel hub 82 is shown in FIG. 11 for attaching a rim (not shown) for the right rear wheel 16. A left rear wheel hub 86 is shown in FIG. 12 for attaching a rim (not shown) for the left rear wheel 15. Another frame cross member 94 spans and is attached to the side rail lower sections 30 beneath the two rear wheel motor and hub mounts 91 to provide added rigidity and strength for the frame 4. The rear wheels 15 and 16 preferably are equipped with wide, inflated balloon tires to avoid making ruts, and to enhance traction.

The controls for controlling the speed and direction of each independently driven rear wheel 15 and 16 comprise the left rear wheel hand control lever 47, the right rear wheel hand control lever 48, both on the control panel 46 and optionally, but preferably, alternately by using a foot pedal assembly 109 (FIGS. 5 and 13) comprising a left rear wheel foot control pedal 110, a right rear wheel foot control pedal 111, a pedal bracket 113 with a post 114 attached to the bracket 113 and a pedal axle 115 for holding the left rear wheel foot control pedal 110 and the right rear wheel foot control pedal 111 in a pivoting manner as shown at 120 on the pedal bracket 113 and the post 114. The pedal bracket 113 is attached to the operator platform 34 at a location preferably below the control panel 46. Connected to each of the foot pedals is a rod, cable or hydraulic line or the like linkage, 118 for the right wheel control foot pedal 11 (see FIG. 5), corresponding with a conventional throttling hydraulic valve (not shown), one linkage 118 between the right rear wheel foot control pedal 110 to control right rear wheel motor 97 and similarly a separate linkage (not shown) running from the left wheel foot control pedal 110 corresponding with a hydraulic throttling valve (not shown) for the right rear wheel motor 96 to not only determine the wheel turning direction (clockwise or counterclockwise to go forward or backward) but also the speed of the turning of the rear wheels and the speed of the S4WSUV in both forward and reverse. An optional pedal link 117 rigidly connected to one of the pedals, in this case to the left control foot pedal 110, extending around a portion, such as a top or bottom portion, but in close proximity to the other control foot pedal, in this case the right control foot pedal 111, to pivotally connect to the pivoting axle 115 at a pivot location 120 on the pedal bracket 113 allows both pedals to be engaged with the same foot to cause the S4WSUV to move fairly straight forward or fairly straight backward. This is another convenient feature for the S4WSUV of the invention.

Referring to FIGS. 1 and 10, the S4WSUV of the invention also comprises a platform or bed 19 pivotally mounted on one side of the platform or bed 19 to the frame 4, preferably using two of the platform supports 25 and a removable pin or bolt 33 running through a hole 22 in two of the platform/container supports 31 mounted to the platform 19 or a platform frame 18 or other platform reinforcement (not shown). The platform 19 can be reinforced with a frame 18 containing various members 24. The platform 19 or platform frame 18 has at least one, preferably two, attaching plates 28 and 23 attached off center for connecting a lifting mechanism 26 (hydraulic cylinder in FIG. 1) to enable one side of the platform 19 to be lifted and to dump material or articles to either the left side or to the right of the S4WSUV depending on whether the lifting mechanism 26 is attached to the lift plate 23 or the lift plate 28. The other end of the lifting mechanism 26 is mounted to the frame 4, such as to the vertical plate 88 (see FIG. 9). When the lifting mechanism 26 is preferably a hydraulic cylinder like shown in FIG. 1, a lift mechanism control (not shown) is typically mounted on the control panel 46. The lift mechanism control is typically a toggle handle or switch communicating with a hydraulic valve that can be moved to cause hydraulic fluid to flow/not flow to and from the hydraulic cylinder in a known manner to lift one end of the platform 19, stop the lifting or retracting and hold, or to retract such that the platform 19 is in a hauling position, e.g. substantially resting on at least one of the upper side rails 101 and/or 102.

As shown in FIG. 1, a container or box 29 can be mounted on the platform 19 in any suitable manner, such as with container mountings 100 mounted at appropriate locations on the container 29 to align with two or more of the container supports 31 on the platform 19 using removable pins or bolts 33, or in any other suitable manner, to cause the container 29 to remain attached to the platform during dumping. The container can be of any shape, height, shape and configuration as described above.

Referring to FIGS. 1-3, the S4WSUV of the preferred embodiment of the invention is equipped with a cantilever mounted seat assembly 39. The seat assembly 39 is comprised of the operator platform frame 35 adapted to attach to the left and right side rail lower sections 30, such as with ends of the platform frame 35 entering side rail openings 38 (see FIG. 9) and secured with removable pins, bolts or other conventional securement. The operator platform frame can optionally have a portion of the operator platform 34 mounted on a front portion permitting the operator to stand to operate the S4WSUV of the invention.

The seat assembly 39 can optionally have the battery and/or tool box 37 mounted on a rear portion of the platform frame 35. One or more batteries for starting the engine 20 and for operating other electrical alternative or optional equipment can be located in the battery and/or tool box 37. The seat deck 41 is attached, preferably pivotally attached, to the top of the battery and/or tool box 37, and preferably an optional padded seat cushion 57 is attached to the seat deck 41. The optional backrest 40 can be mounted to the seat assembly 39 in a known manner.

To operate the S4WSUV the operator starts the engine 20 and starts the S4WSUV moving forward by moving the left wheel control lever 47 and the right wheel control lever 48 on the control panel 46 towards the front of the S4WSUV standing on the ground and walking behind or standing on the operator platform 34 or sitting on the seat assembly 39, or can, usually while sitting down, press the tops of the right and left wheel foot pedals 110, 111 towards the front of the S4WSUV or, alternatively push the pedal link 117 and the top of the right wheel foot pedal 111 towards the front of the S4WSUV. The left wheel control lever 47 and the right wheel control lever 48 and the right and left wheel foot pedals 110, 111 are biased in a neutral position such that when the hands or feet are removed from these controls, the S4WSUV will come to a stop. Preferably, the parking brake is activated by moving the parking brake lever 45 on the control panel 46.

To move in reverse, the left wheel control lever 47 and the right wheel control lever 48 on the control panel 46 are pulled backwards away from the front of the S4WSUV while standing on the ground and walking backwards or standing on the operator platform 34 or sitting on the seat assembly 39, or can, usually while sitting down, press the bottoms of the right and left wheel foot pedals 110, 111 towards the front of the S4WSUV. The forward and reverse speed is varied and controlled by the amount the hand levers 47,48 on the control panel 46, or the amount the right and left wheel control pedals 110,111 are moved away from the neutral position.

While moving forward, to steer the S4WSUV to the right the left rear wheel is controlled to turn faster than the right wheel, and to turn right at or about zero turn radius the right wheel control(s) are left in the neutral position while a left wheel control is moved to make the left wheel move forward and to steer to the left. To steer the S4WSUV to the left while moving forward the right rear wheel is controlled to turn faster than the left wheel, and to turn left at or about zero turn radius the left wheel control(s) are left in the neutral position while a right wheel control is moved to make the right wheel move forward. The same procedure is used to steer when the vehicle is moving in reverse. This method of steering requires much less effort and attention, allowing the operator to focus more on properly and safely positioning the S4WSUV to dump the load in the desired location.

When the S4WSUV of the invention is in position to dump the material load in the desired location, the S4WSUV is stopped, the parking brake can be applied particularly if on a steep slope, and the lifting mechanism control lever/switch (not shown) is moved to raise the platform 19 until the material load, or desired portion is dumped and then the control lever/switch is moved to retract the lifting mechanism.

As mentioned above, many variations, alternatives, and equivalents of the various elements of the invention can be made while still using the spirit of the invention, and also many options can be added to accomplish functions such as grading, spraying, blowing, mowing, etc. while also using the spirit of the invention. Such embodiments can included within the scope of the claims below. For example, instead of the drive for the independently driven rear wheels 15,16 being a hydrostatic drive as in the preferred embodiment described just above, the drive could be a conventional all electric drive, or a combination of the two as is known such as a hydraulic lifting mechanism 26 and an electric drive for each of the independently driven rear wheels 15,16. The power source 57 could be one or more AC or DC electrical alternators or generators and the rear wheel drive motors 96,97 could be high-torque electric motors. Instead of the hydraulic valves, electrical switches and speed controls could be used. Instead of the hydraulic hoses 98 and fittings 99, electrical wires could be used in a known manner. In the alternative, any conventional mechanical drive can be used to independently drive the rear wheels 15,16.

The invention claimed is:

1. A small, four wheeled, stable, utility vehicle (S4WSUV) for tasks including hauling and dumping comprising;
 a) a frame having a length or lengths and a width or widths,
 b) four wheels, including widely spaced apart front wheels being supported by a front portion of the frame and mounted to freely swivel and two widely spaced apart independently driven rear wheels spaced from the two front wheels and supported by a rear portion of the frame with one of said independently driven rear wheels being on one side of the frame and the other independently driven rear wheel being on an opposite side of the frame,
 c) one or more engines,
 d) a motor or drive mechanism for driving each of the independently driven rear wheels in a clockwise and counter clockwise direction,
 e) a platform pivotly supported by a side of the frame for supporting material or one or more articles or one or more containers,
 f) a lifting mechanism communicating with a location off-center of the platform for pivoting the platform to dump the material, article(s) or the one or more containers on or attached to the platform to a location near a side of the S4WSUV and for retracting the platform to a hauling position, g) one or more power sources for powering each motor or drive mechanism and the lifting mechanism, and h) controls for activating each motor or drive mechanism and the lifting mechanism.

2. The S4WSUV of claim 1 wherein the one or more engines comprise an internal combustion engine.

3. The S4WSUV of claim 2 further comprising one or more electrical storage batteries and an electrical starter for the internal combustion engine.

4. The S4WSUV of claim 1 wherein the frame comprises one or more attachments for attaching a functional device for providing a function other than hauling and dumping material or articles.

5. The S4WSUV of claim 1 wherein the platform comprises one or more container mountings for securing one or more containers to the platform or a platform frame.

6. The S4WSUV of claim 2 wherein the platform comprises one or more container mountings for securing one or more containers to the platform or a platform frame.

7. The S4WSUV of claim 1 wherein the controls comprise foot controls for activating each motor or drive mechanism for moving and steering.

8. The S4WSUV of claim 2 wherein the controls comprise both hand and foot controls for activating each motor or drive mechanism for moving and steering.

9. The S4WSUV of claim 7 further comprising a cantilever mounted seat assembly at the rear of the S4WSUV for allowing an operator to stand or sit while operating the S4WSUV.

10. The S4WSUV of claim 8 further comprising a cantilever mounted seat assembly at the rear of the S4WSUV for allowing an operator to stand or sit while operating the S4WSUV.

11. The S4WSUV of claim 1 wherein the one or more power sources comprises a hydrostatic drive system for each motor or drive mechanism.

12. The S4WSUV of claim 2 wherein the one or more power sources comprises a hydrostatic drive system for each motor or drive mechanism.

13. The S4WSUV of claim 9 wherein the one or more power sources comprises a hydrostatic drive system for each motor or drive mechanism.

14. The S4WSUV of claim 10 wherein the one or more power sources comprises a hydrostatic drive system for each motor or drive mechanism.

15. The S4WSUV of claim 1 wherein the one or more power sources comprises an electrical generating device for supplying electricity to drive each motor or drive mechanism, each motor or drive mechanism being an electric motor.

16. The S4WSUV of claim 2 wherein the one or more power sources comprises an electrical generating device for supplying electricity to drive each motor or drive mechanism, each motor or drive mechanism being an electric motor.

17. The S4WSUV of claim 9 wherein the one or more power sources comprises an electrical generating device for supplying electricity to drive each motor or drive mechanism, each motor or drive mechanism being an electric motor.

18. The S4WSUV of claim 10 wherein the one or more power sources comprises an electrical generating device for supplying electricity to drive each motor or drive mechanism, each motor or drive mechanism being an electric motor.

19. The S4WSUV of claim 1 wherein the one or more power sources comprises a mechanical drive comprising a plurality of gears, pulleys, belts or chains for driving the rear wheels independently.

20. A small, four wheeled, stable, utility vehicle (S4WSUV) for tasks including hauling and dumping comprising;

a) a frame having a length or lengths and a width or widths, b) four wheels, including widely spaced apart front wheels being supported by a front portion of the frame and mounted to freely swivel and two widely spaced apart independently driven rear wheels spaced from the two front wheels and supported by a rear portion of the frame with one of said independently driven rear wheel being on one side of the frame and the other independently driven rear wheel being on an opposite side of the frame, c) an internal combustion engine, d) a platform pivotly supported by a side of the frame for supporting material or one or more articles or one or more containers, e) a lifting mechanism comprising one or more hydraulic cylinders communicating with a location off-center of the platform for pivoting the platform to dump the material, article(s) or the one or more containers on or attached to the platform to a location near the a side of the S4WSUV and for retracting the platform to a hauling position, f) a hydrostatic drive comprising one or more hydraulic pumps and a hydraulic motor connected to each rear wheel for independently driving each rear wheel in a clockwise and counter clockwise direction, a hydraulic pump also providing power for a hydraulic cylinder, g) a cantilever mounted seat assembly at the rear of the S4WSUV for allowing the operator to stand or sit while operating the S4WSUV, and h) controls for activating each drive and the lifting mechanism comprising both hand levers and foot pedals for activating each drive.

* * * * *